US011905732B2

(12) United States Patent
Smith et al.

(10) Patent No.: US 11,905,732 B2
(45) Date of Patent: Feb. 20, 2024

(54) DOOR LOCK ASSEMBLY WITH INTERCHANGEABLE CYLINDERS

(71) Applicant: Austin Hardware & Supply, Inc., Lee's Summit, MO (US)

(72) Inventors: Norman A. Smith, Buford, GA (US); Robert Walden, Buford, GA (US)

(73) Assignee: Austin Hardware & Supply, Inc., Lee's Summit, MO (US)

( * ) Notice: Subject to any disclaimer, the term of this patent is extended or adjusted under 35 U.S.C. 154(b) by 167 days.

(21) Appl. No.: 17/687,030

(22) Filed: Mar. 4, 2022

(65) Prior Publication Data

US 2022/0282525 A1 Sep. 8, 2022

Related U.S. Application Data

(60) Provisional application No. 63/157,047, filed on Mar. 5, 2021.

(51) Int. Cl.

| | |
|---|---|
| ***E05B 13/00*** | (2006.01) |
| ***E05B 9/08*** | (2006.01) |
| ***E05B 3/06*** | (2006.01) |
| ***E05B 13/10*** | (2006.01) |

(52) U.S. Cl.
CPC ............ *E05B 13/004* (2013.01); *E05B 3/065* (2013.01); *E05B 9/084* (2013.01); *E05B 13/106* (2013.01)

(58) Field of Classification Search
CPC ...... E05B 13/00; E05B 13/002; E05B 13/004; E05B 13/10; E05B 47/0657; E05B 3/00; E05B 3/06; E05B 3/065; E05B 9/00; E05B 9/084; E05B 9/086; E05B 9/088; E05B 13/106; E05B 13/101; E05B 13/103; E05B 13/105; E05B 13/108
USPC ........................................................... 70/208
See application file for complete search history.

(56) References Cited

U.S. PATENT DOCUMENTS 5,634,357 A * 6/1997 Nutter .................. E05B 13/106 70/210
6,041,630 A * 3/2000 Shen .................... E05B 13/101 70/472
6,178,789 B1 * 1/2001 Finkelstein ........... E05B 13/106 70/210
6,546,765 B1 * 4/2003 Linares ................ E05B 13/108 70/216
2007/0051145 A1 * 3/2007 Chang .................. E05B 13/108 70/279.1

FOREIGN PATENT DOCUMENTS

GB 2040344 A * 8/1980 ........... E05B 13/106

* cited by examiner

*Primary Examiner* — Nathan Cumar
(74) *Attorney, Agent, or Firm* — Polsinelli PC

(57) ABSTRACT

A door lock assembly with interchangeable lock cylinders is described. The door lock assembly includes a handle. The handle includes a lock cylinder passage to receive a push to lock cylinder or a key to lock cylinder. A spring plate includes a bolt opening to position the lock cylinder. The spring plate further includes a side bolt opening. A side bolt is configured to selectively enter the side bolt opening of the spring plate to lock the lock cylinder and to selectively withdraw the side bolt from the side bolt opening of the spring plate to unlock the lock cylinder.

21 Claims, 5 Drawing Sheets

FIG. 5
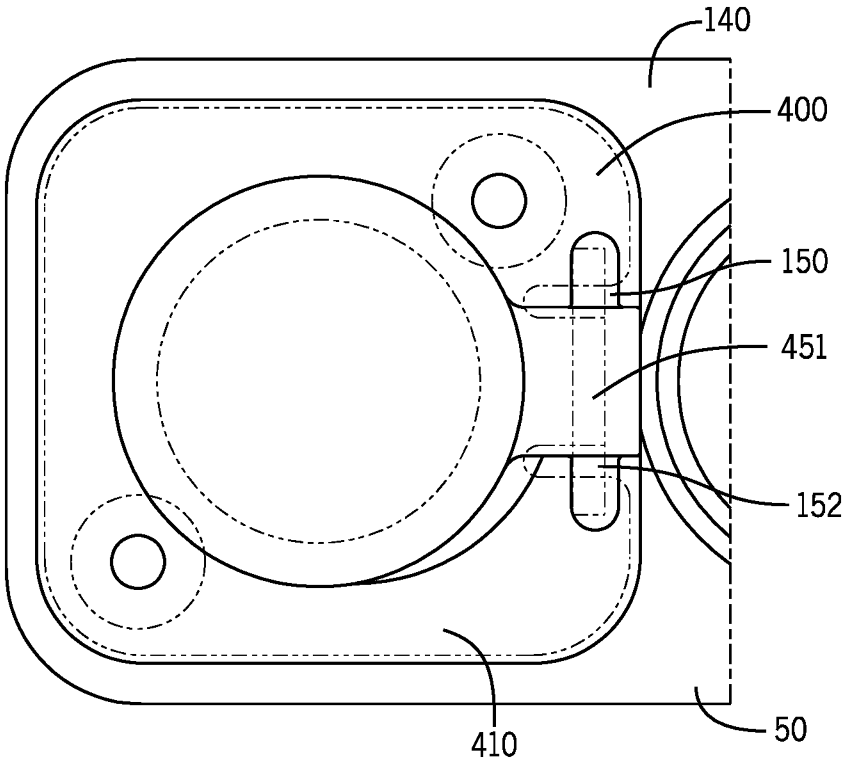
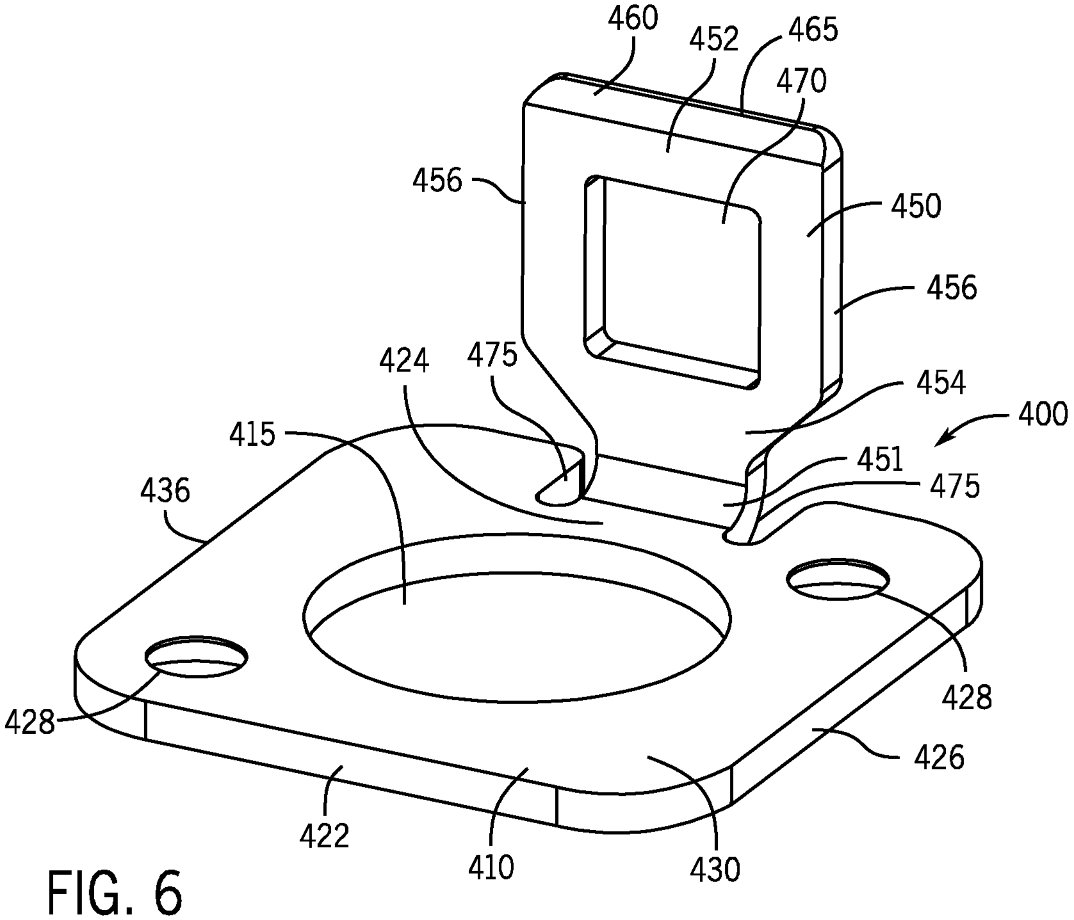
FIG. 6

DOOR LOCK ASSEMBLY WITH INTERCHANGEABLE CYLINDERS

The present application claims priority to U.S. Provisional Patent Application No. 63/157,047 filed Mar. 5, 2021.

FIELD OF INVENTION

The present invention relates to a door lock assembly with interchangeable lock cylinders.

BACKGROUND

Door lock assemblies with removable or interchangeable lock cylinders are known. Such door lock assemblies may be used on cargo doors of trucks and other delivery vehicles. Users may wish to change lock cylinders when a key to the lock cylinder becomes lost, when employees change, or to just increase security. Users may wish to change between a push to lock cylinder and a key to lock cylinder for different uses or applications of the door lock assembly. Typically, the door lock assemblies require complicated disassembly and the changing or replacement of internal parts or components in order to switch the door lock assembly from a push to lock cylinder to a key to lock cylinder and vice versa.

SUMMARY

A door lock assembly with interchangeable lock cylinders is described. The door lock assembly accommodates both a push to lock cylinder or a key to lock cylinder by a quick and simple replacement of the respective cylinder. The door lock assembly includes a spring plate that readily functions with either lock cylinder without disassembling any of the door lock assembly. In order to switch between push to lock and key to lock, the user only has to change the lock cylinder by removing the push to lock cylinder and replacing it with the key to lock cylinder—since both lock cylinders function with the same spring plate. The spring plate does not need to be removed or adjusted in order to change between the respective lock cylinders. The lock cylinders may be easily interchanged by the end user without disassembly of the door lock.

Both the push to lock cylinder and the key to lock cylinder use a key to unlock. The difference is that the push to lock cylinder does not require a key to lock the handle. In order to lock the push to lock cylinder, the user just presses the lock cylinder down or inward and to the locked position. However, as noted above, the push to lock cylinder requires a key to unlock, and the lock cylinder pops up or outward when unlocked. The key to lock cylinder requires the user to rotate the key in order to push the lock cylinder down or inward to the locked position. The key to lock cylinder requires the key to unlock, and the lock cylinder pops up when unlocked.

The spring plate includes a base portion with a bolt opening for the locking bolt of either of the lock cylinders. The spring plate further includes a tab portion that extends perpendicular to the base portion. The tab portion includes an opening, receptacle, or striker to receive a side bolt or positioner from the respective lock cylinder. In some aspects, the opening may pass entirely through the tab portion. The tab portion works with both push to lock and key to lock cylinders—without modification or adjustment. The spring plate combines a closure portion and a striker portion to provide functionality for both the push to lock and key to lock by only changing a lock cylinder—without disassembling any of the door lock assembly.

The door lock assembly and the spring plate also reduces manufacturing complexity. A handle of the door lock assembly can be machined from one side/one direction, which reduces costs.

In one aspect, a door lock assembly is described. The door lock assembly includes a handle. The handle includes a lock cylinder passage. A lock cylinder includes a locking bolt and a side bolt. The lock cylinder is a push to lock cylinder or a key to lock cylinder. The handle receives the lock cylinder in the lock cylinder passage. A spring plate includes a bolt opening to receive the locking bolt. The spring plate further includes a side bolt opening. The side bolt is configured to selectively enter the side bolt opening of the spring plate to lock the lock cylinder and to selectively withdraw the side bolt from the side bolt opening of the spring plate to unlock the lock cylinder. An escutcheon plate includes a locking opening. The handle is configured to rotate relative to the escutcheon plate. The locking bolt of the lock cylinder is configured to selectively enter the locking opening of the escutcheon plate to prevent rotation of the handle and to selectively withdraw from the locking opening of the escutcheon plate to permit rotation of the handle.

In another aspect, a door handle assembly is described. The door handle assembly includes a handle. The handle includes a lock cylinder passage. The lock cylinder passage is configured to receive a push to lock cylinder or a key to lock cylinder. A spring plate includes a base portion and a tab portion. The tab portion is generally perpendicular to the base portion. The base portion includes a bolt opening to receive a locking bolt of the push to lock cylinder or the key to lock cylinder. The tab portion includes a side bolt opening to receive a side bolt from the push to lock cylinder or the key to lock cylinder.

In another aspect, a door lock assembly is described. The door lock assembly includes a handle. The handle includes a lock cylinder passage. The handle is configured to rotate a bar. A lock cylinder includes a locking bolt and a side bolt. The lock cylinder is a push to lock cylinder or a key to lock cylinder. A spring plate includes a bolt opening to receive the locking bolt of the lock cylinder. The spring plate further includes a side bolt opening. The side bolt is configured to selectively enter the side bolt opening of the spring plate to lock the lock cylinder and to selectively withdraw the side bolt from the side bolt opening of the spring plate to unlock the lock cylinder. A spring biases the lock cylinder away from the spring plate. The handle removably receives the lock cylinder in the lock cylinder passage. An escutcheon plate includes a bar opening and a locking opening. The handle is configured to rotate relative to the escutcheon plate. The bar passes through the bar opening of the escutcheon plate to engage a further locking mechanism, door handle, etc. The locking bolt is configured to selectively enter the locking opening of the escutcheon plate to prevent rotation of the handle and to selectively withdraw from the locking opening of the escutcheon plate to permit rotation of the handle.

In another aspect, a method of changing a lock cylinder in a door handle assembly is described. The method includes providing a door handle assembly. The door handle assembly includes a handle. The handle includes a lock cylinder passage. The lock cylinder passage houses a first lock cylinder. The door handle assembly includes a spring plate having a base portion and a tab portion. The base portion includes a bolt opening to receive a locking bolt. The tab portion includes a side bolt opening to receive a first side bolt from the first lock cylinder. The method includes removing the first lock cylinder from the lock cylinder passage. The method includes providing a second lock cylinder, where the second lock cylinder includes a different style of locking mechanism than the first locking mechanism. The method includes installing the second lock cylinder in the lock cylinder passage. The method includes operating the second locking cylinder to extend a second side bolt into the side bolt opening without adjusting the spring plate. The first and second lock cylinders may include a push to lock cylinder and a key to lock cylinders. Both the push to lock and key to lock cylinders engage the same spring plate without having to disassemble the door handle assembly.

BRIEF DESCRIPTION OF DRAWINGS

FIG. 5 is a lower view of the lock cylinder passage of the handle.

FIG. 6 is a perspective view of the spring plate.

DETAILED DESCRIPTION OF INVENTION

Figure 1:
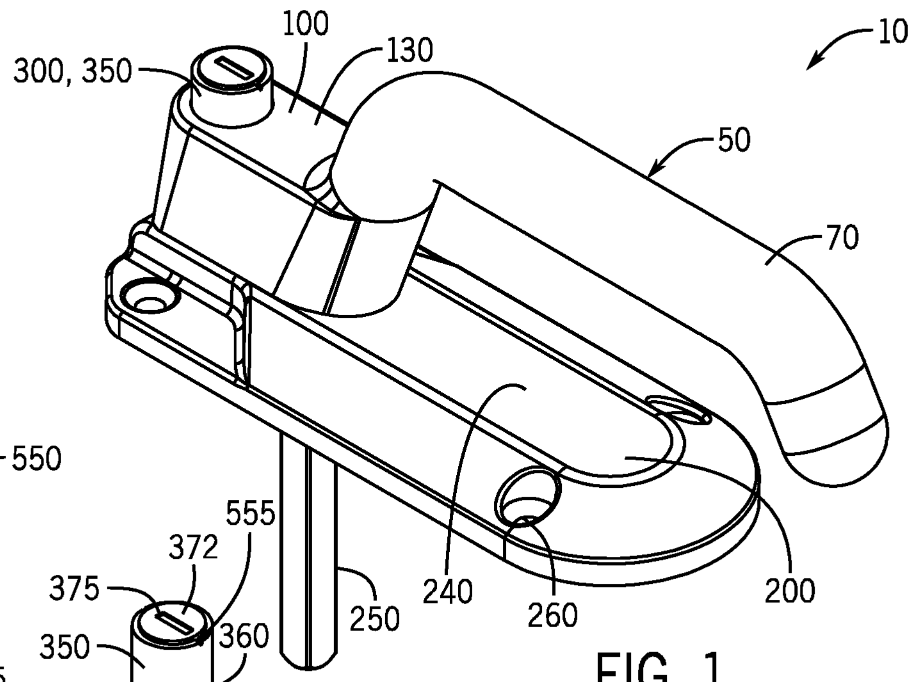
FIG. 1 is a perspective view of the door lock assembly.
Figure 2:
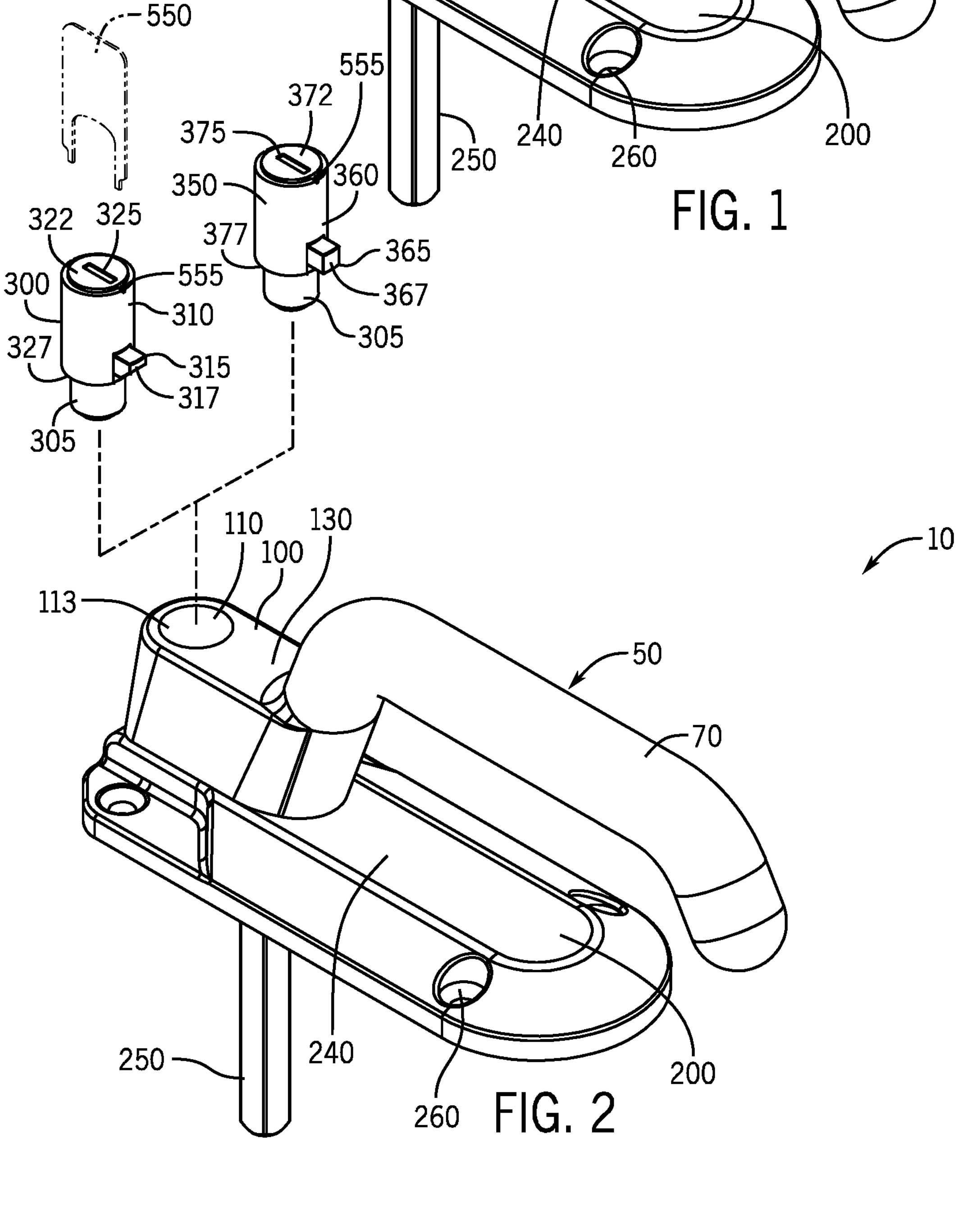
FIG. 2 is a perspective view of the door lock assembly showing the push to lock and key to lock cylinders.

For purposes of this application, any terms that describe relative position (e.g., "upper", "middle", "lower", "outer", "inner", "above", "below", "bottom", "top", etc.) refer to an embodiment of the invention as illustrated, but those terms do not limit the orientation in which the embodiments can be used.

A door lock assembly 10 will now be described with reference to FIGS. 1-8D. The door lock assembly 10 incudes a handle 50 that rotates relative to an escutcheon plate 200. In this aspect, the handle 50 rotates a bar 250, which typically passes through a width of a door or other structure upon which the door lock assembly 10 is mounted. A distal end of the bar 250 may engage with another door handle, lock, etc. on the other side of the door.

The handle 50 includes a grip portion 70 and a base portion 100. In this aspect, the grip portion 70 is integral with the base portion 100.

Figure 4:
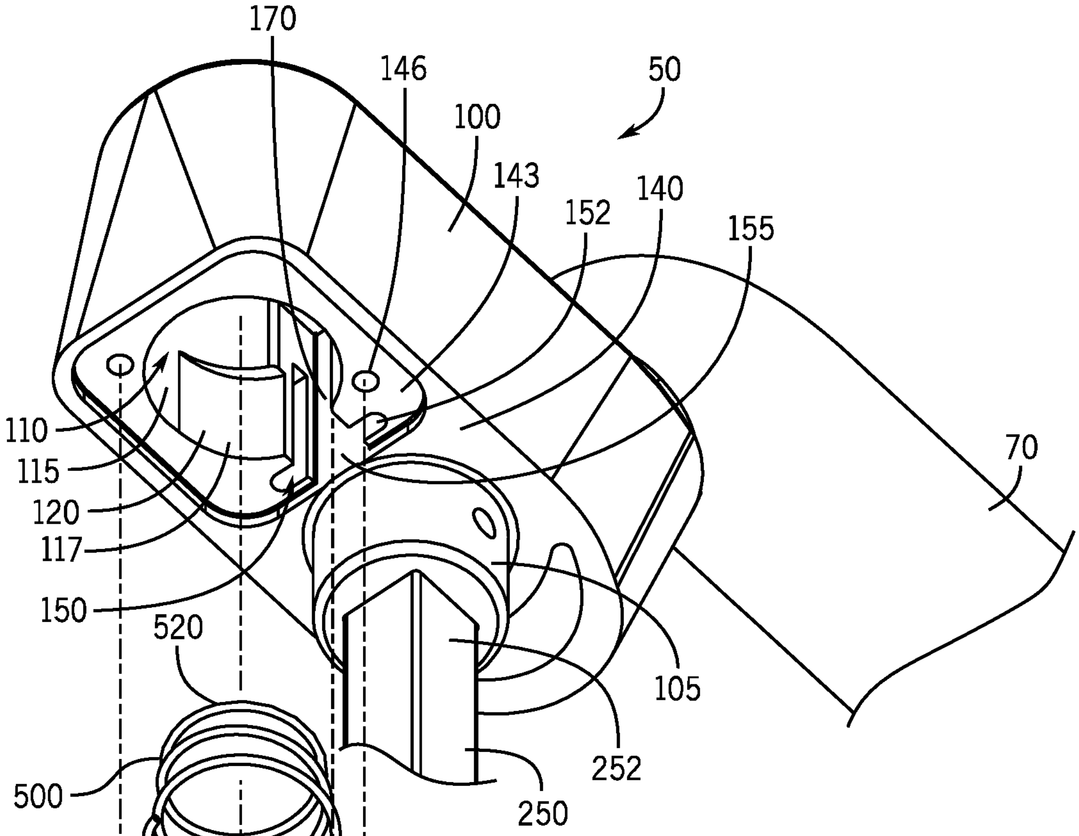
FIG. 4 is a lower perspective view of the lock cylinder passage of the handle and the spring plate.
Figure 4:
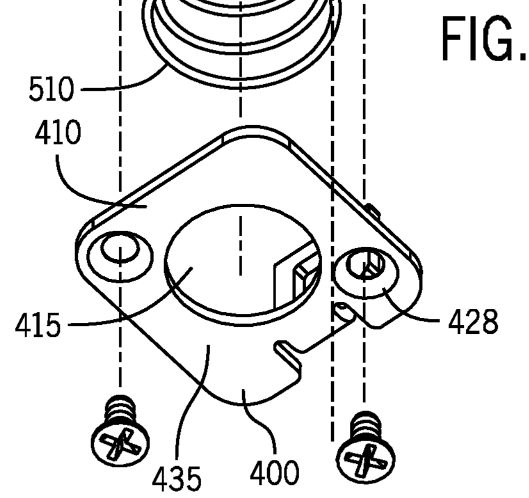
Figure 3:
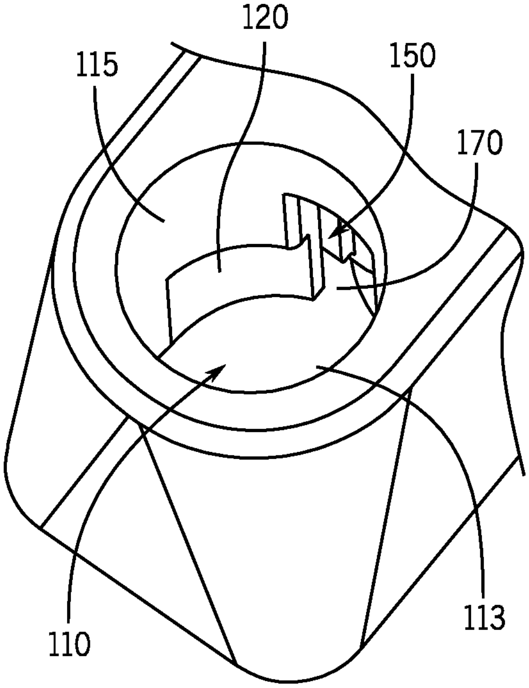
FIG. 3 is an upper perspective view of the lock cylinder passage of the handle.

With respect to FIG. 4, the handle 50 includes a bar receiving portion 105 that engages with a proximal end 252 of the bar 250. In this aspect, the bar receiving portion 105 is fixedly connected to the proximal end 252 of the bar 250.

The base portion 100 of the handle 50 includes a lock cylinder passage 110, which receives either the push to lock cylinder 300 or the key to lock cylinder 350. Depending on the desired operation and function, the user may exchange the push to lock cylinder 300 for the key to lock cylinder 350 and vice versa. The user may exchange the key to lock cylinder 350 for another key to lock cylinder 350. This may be helpful when the user wishes to change the locks between users or when a key is lost.

The push to lock cylinder 300 or the key to lock cylinder 350 inserts into the lock cylinder passage 110. When unlocked, the push to lock cylinder 300 or the key to lock cylinder 350 may rotate within the lock cylinder passage 110. The lock cylinder passage 110 includes an inner surface 115. A portion of the inner surface 115 forms a cam surface 120, which assists in the removal of the push to lock cylinder 300 or the key to lock cylinder 350 from the handle 50. The cam surface 120 is formed on an inner diameter of the lock cylinder passage 110.

An exterior surface 130 of the handle 50 faces outward toward the user. An interior surface 140 of the handle 50 is generally flush against an exterior surface 240 of the escutcheon plate 200. The interior surface 140 of the handle 50 includes a recess 143 to receive the spring plate 400. The recess 143 includes holes 146 to match holes 428 of the spring plate 400, which receives fasteners, such as screws, to affix or secure the spring plate 400 to the interior surface 140 of the handle 50.

The lock cylinder passage 110 leads to a channel 150. The channel 150 includes an inner wall 155 and an upper wall 160. A connecting passage 170 connects the lock cylinder passage 110 and the channel 150. As described below in greater detail, a portion of the spring plate 400 fits into the channel 150.

The escutcheon plate 200 includes the exterior surface 240 generally opposite of an inner surface 255. The inner surface 255 may be mounted against a door, hatch, or other closing member. Holes 260 may pass through the escutcheon plate 200, which receive screws or other fasteners to mount the escutcheon plate 200 to the door, hatch, or other closing member.

The escutcheon plate 200 includes a locking opening 210 and a bar opening 230. The locking opening 210 and the bar opening 230 are spaced a distance apart. The bar opening 230 generally provides the axis of rotation for the door handle 50. The locking bolt 305 or 355 is configured to selectively enter the locking opening 210 of the escutcheon plate 200 to prevent rotation of the handle 50 and to selectively withdraw from the locking opening 210 to permit rotation of the handle 50. The locking bolt 305 or 355 is configured to move downward to enter the locking opening 210 of the escutcheon plate 200 and upward to exit the locking opening 210.

The push to lock cylinder 300 includes the locking bolt 305 that extends from a main body 310 of the push to lock cylinder 300. A side bolt 315 extends from a side of the main body 310. The side bolt 315 includes a cam surface 317. An outer end 322 of the push to lock cylinder 300 includes a key opening 325. A shoulder 327 is formed between the main body 310 and the locking bolt 305.

Similarly, the key to lock cylinder 350 includes the locking bolt 355 that extends from a main body 360 of the key to lock cylinder 350. A side bolt 365 extends from a side of the main body 360. The side bolt 365 includes a square surface 367. An outer end 372 of the push to lock cylinder

300 includes a key opening 375. A shoulder 377 is formed between the main body 360 and the locking bolt 355. Both the push to lock cylinder 300 and the key to lock cylinder 350 use a key 390 to unlock, respectively.

The spring plate 400 will now be described with reference to FIG. 6. The spring plate 400 includes a base portion 410 and a tab portion 450. The base portion 410 fits into the recess 143 of the handle 50. The base portion 410 includes a bolt opening 415. In this aspect, the bolt opening 415 is generally round to be complementary to locking bolts 305 and 355 of the lock cylinder 300 and the lock cylinder 350.

In this aspect the base portion 410 includes a generally square shape. The base portion 410 includes a proximal side 424 generally opposite to a distal side 422. Lateral sides 426 are between the proximal side 424 and the distal side 422. The holes 428 receive fasteners, such as screws, to engage the spring plate 400 to the holes 146 in the recess 143. The base portion 410 includes an inner surface 430 generally opposite to an outer surface 435. The inner surface 430 is generally flush against the recess 143.

The tab portion 450 includes a proximal side 454 generally opposite of a distal side 452. Lateral sides 456 of the tab portion 450 are between the proximal side 454 and the distal side 452. The proximal side 454 of the tab portion 450 joins the proximal side 424 of the base portion 410 at a transition 451. Relief cuts 475 may be formed on sides of the transition 451. The transition 451 may form an approximately 90 degree angle. In this aspect, the transition 451 is integral to both the base portion 410 and the tab portion 450.

The tab portion 450 is generally perpendicular to the base portion 410. The tab portion 450 defines an opening 470. In this aspect, the opening 470 passes clear through the tab portion 450. The side bolt 315 or 365 is configured to selectively enter the opening 470 of the spring plate 400 to lock the lock cylinder 300 or 350 and to selectively withdraw the side bolt 315 or 365 from the opening 470 of the spring plate 400 to unlock the lock cylinder 300 or 350. In a locked position, the side bolt 315 or 365 is fixed in position in the opening 470 and cannot be normally be removed unless the key 390 is actuated. In an unlocked position, the side bolt 315 or 365 is retracted from the opening 470.

During assembly, the tab portion 450 of the spring plate 400 slides into the channel 150. A length of the channel 150 is generally parallel to the lock cylinder passage 110. The lock cylinder passage 110 comprises an upper opening 113 in an exterior surface 130 of the handle 50 and a lower opening 117 in an interior surface 140 of the handle 50. Typically, during installation or replacement of the push to lock cylinder 300 or the key to lock cylinder 350, the new lock cylinder 300 or 350 inserts into the upper opening 113 of the lock cylinder passage 110. The channel 150 includes a channel opening 152 in the interior surface 140 of the handle 50 proximate the lower opening 117. The channel 150 helps to position the tab portion 450 such that the opening 470 is properly aligned to receive the side bolt 315 or 365. The side bolts 315 or 365 extend and retract generally perpendicular to a vertical axis of the push to lock cylinder 300 or the key to lock cylinder 350. Once assembled, the spring plate 400 does not need to be removed, exchanged, or repositioned in order to switch between the push to lock cylinder 300 and the key to lock cylinder 350. When switching between the push to lock cylinder 300 and the key to lock cylinder 350, no adjustment to the spring plate 400 is needed.

With respect to FIG. 5, the lock cylinder passage 110 leads to the channel 150. The channel 150 has a width just larger than a width of the tab portion 450, such that the tab portion 450 fits in the channel 150. The connecting passage 170 connects the lock cylinder passage 110 and the channel 150. The connecting passage 170 is sized to permit the side bolts 315 or 365 to pass through the connecting passage 170 and into the channel 150 and the opening 470 of the spring plate 400. The connecting passage 170 has a width smaller than the width of the channel 150. The channel 150 includes the inner wall 155 and the upper wall 160. When installed, the tab portion 450 is generally flush against the inner wall 155. In an unlocked position, the side bolt 315 or 365 is in a void 490 above an upper portion 460 of the distal side 452 of the tab portion 450.

A lock spring 500 biases the lock cylinder 300 or 350 away from the spring plate 400. A first side 510 of the lock spring 500 biases against the inner surface 430 of the spring plate 400. The first side 510 of the lock spring 500 is around the lower opening 117 of the lock cylinder passage 110. A second side 520 of the lock spring 500 biases against the shoulder 327 or 377 of the lock cylinder 300 or 350.

Figure 7A:
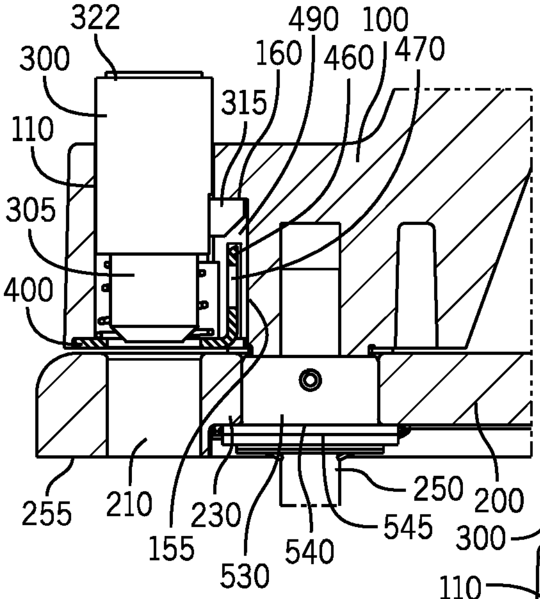
FIG. 7A is a sectional view of the door lock assembly with the push to lock cylinder in the unlocked position.

In this aspect, as identified in FIG. 7A, a combination of a flanged bearing 530, a washer 540, and a nut 545 rotatably hold the handle 50 and the bar 250 to the escutcheon plate 200. In other aspects, the handle 50 and the spring plate 400 may be used without the bar 250 and/or the escutcheon plate 200. For example, the handle 50 may be directly mounted to a door or other closure.

Figure 7B:
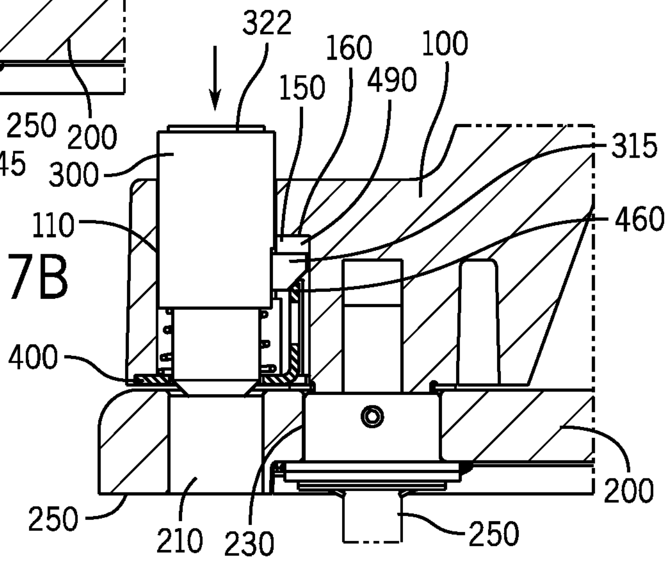
FIG. 7B is a sectional view of the door lock assembly with the push to lock cylinder getting pushed.
Figure 7C:
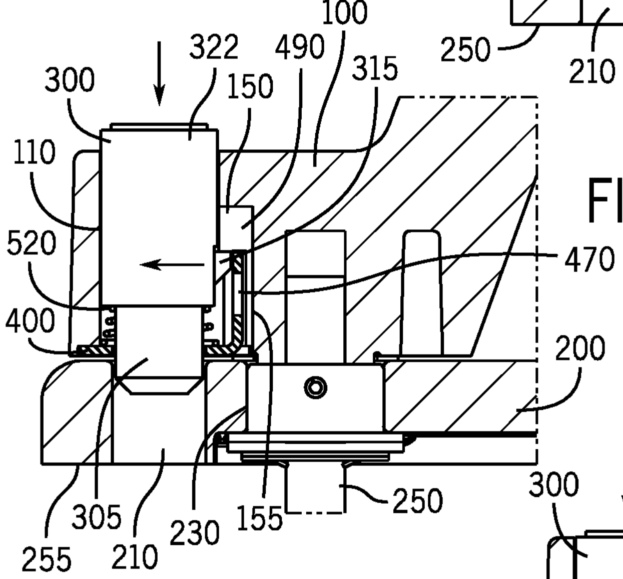
FIG. 7C is a sectional view of the door lock assembly with the push to lock cylinder getting pushed and the side bolt camming against the spring plate.
Figure 7D:
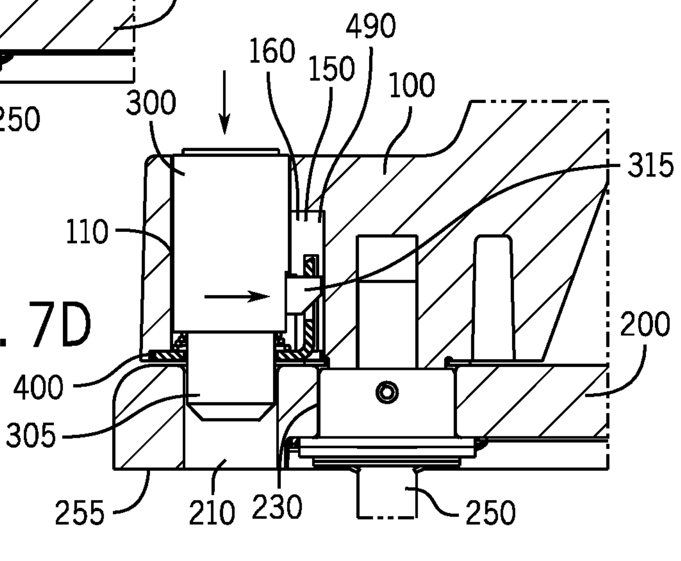
FIG. 7D is a sectional view of the door lock assembly with the push to lock cylinder in the locked position.

The locking sequence of the push to lock cylinder 300 is shown in FIGS. 7A-7D. FIG. 7A shows the push to lock cylinder 300 in an installed and unlocked position. The side bolt 315 is in the void 490 above the upper portion 460 of the distal side 452 of the tab portion 450. FIG. 7B shows a pushing force against the push to lock cylinder 300 and the cam surface 317 of the side bolt 315 camming against the upper portion 460. The upper portion 460 is partially angled or chamfered to provide a camming surface or ramp surface to receive the side bolt 315. FIG. 7C shows the side bolt 315 retracted. FIG. 7D shows the side bolt 315 extended into the opening 470 of the tab portion 450, which is a locked position. With the side bolt 315 trapped in the opening 470, the push to lock cylinder 300 cannot be rotated or removed without use of the key 390. The locking bolt 305 has traveled into the locking opening 210 of the escutcheon plate 200, and the handle 50 cannot be rotated.

Figure 8A:
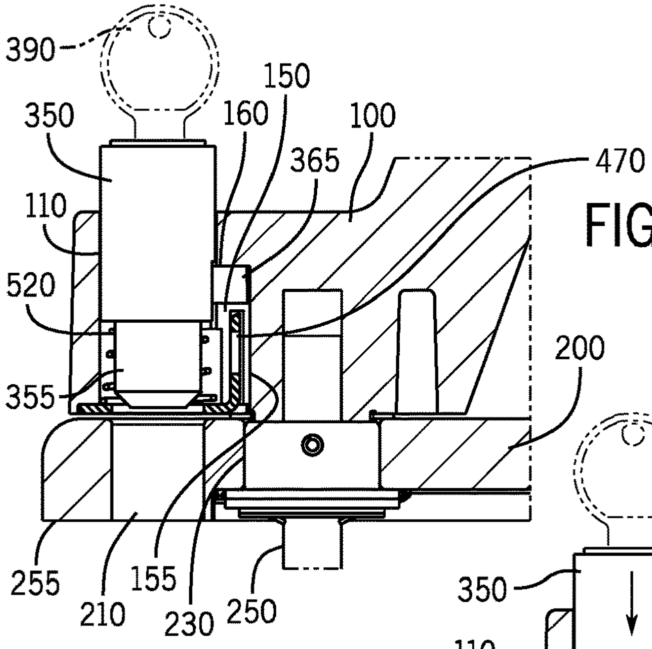
FIG. 8A is a sectional view of the door lock assembly with the key to lock cylinder in the unlocked position.
Figure 8B:
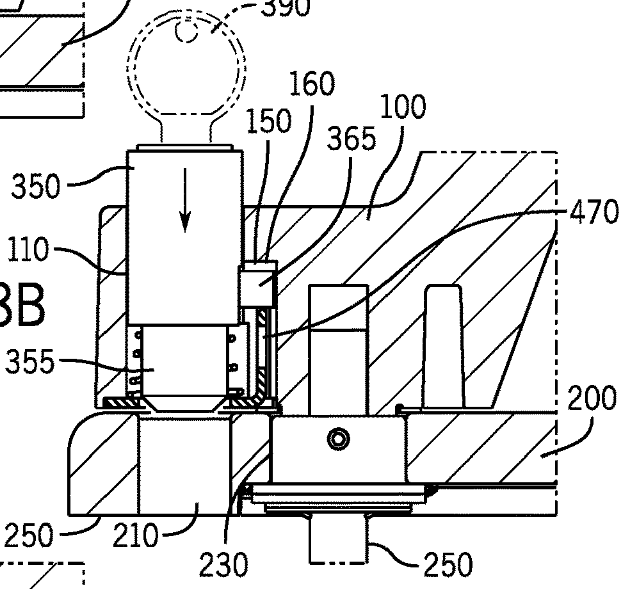
FIG. 8B is a sectional view of the door lock assembly with the key to lock cylinder getting pushed.
Figure 8C:
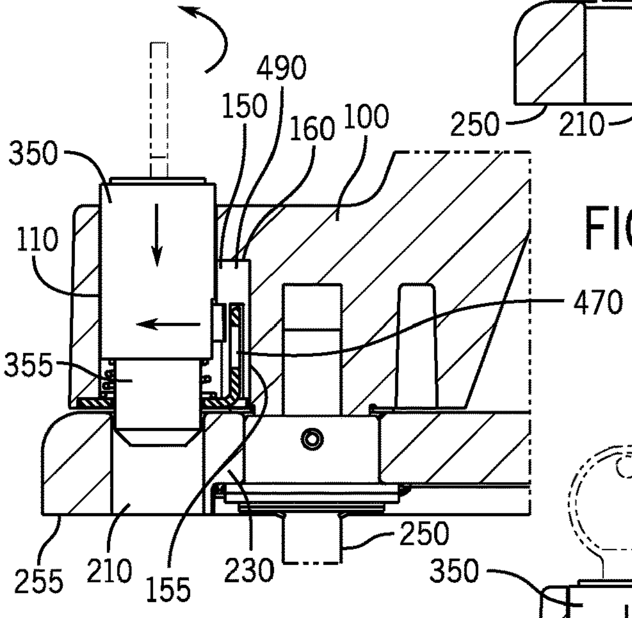
FIG. 8C is a sectional view of the door lock assembly with the key to lock cylinder getting pushed and the key moving the side bolt.
Figure 8D:
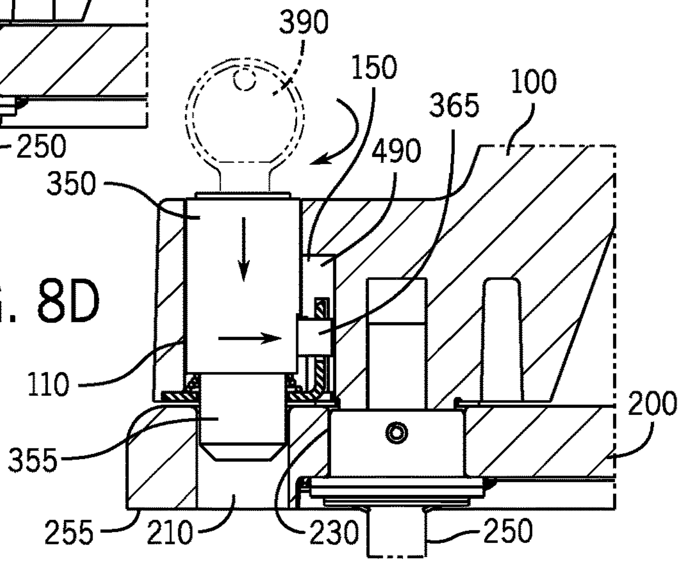
FIG. 8D is a sectional view of the door lock assembly with the key to lock cylinder in the locked position.

The locking sequence of the key to lock cylinder 350 is shown in FIGS. 8A-8D. FIG. 8A shows the key to lock cylinder 350 in an installed and unlocked position. The side bolt 365 is in the void 490 above the upper portion 460 of the distal side 452 of the tab portion 450. The upper portion 460 includes an upper surface 465. The upper surface 465 is generally flat or planar such that a lower surface of the side bolt 365 locks against the upper surface 465. In this aspect, the upper surface 465 is configured to prevent the side bolt 365 from inadvertently driving against the upper surface 465 and causing the side bolt 365 to retract. The upper surface 465 may be generally parallel to a lower surface of the side bolt 365. FIG. 8B shows a push force against the key to lock cylinder 350. FIG. 8C shows a counter-clockwise rotation of the key 390 to retract the side bolt 365. FIG. 8D shows a clockwise rotation of the key 390 to extend the side bolt 365 into the opening 470 of the tab portion 450, which is a locked position. With the side bolt 365 trapped in the opening 470, the key to lock cylinder 350 cannot be rotated or removed without use of the key 390. The locking bolt 355 has traveled into the locking opening 210 of the escutcheon plate 200, and the handle 50 cannot be rotated.

During the locking of the lock cylinder 300 and the lock cylinder 350, the side bolts 315 or 365 are both retracted past the same upper portion 460 and upper surface 465 of the tab portion 450. As described above, no adjustment (such as repositioning) is needed to the spring plate spring plate 400 in order for the respective side bolts 315 or 365 to engage the opening 470 of the spring plate 400. The side bolts 315 and 365 engage the opening 470 of the spring plate 400 with the spring plate 400 in the same position regardless of which lock cylinder 300 and the lock cylinder 350 is employed. This provides an easy interchange of the lock cylinders 300 and 350 for the end user.

In order to remove the lock cylinder 300 or 350, the key 390 is rotated to the unlocked position (clockwise) and the key 390 is held in this position. The lock cylinder 300 or 350 is pushed inward while holding the key 390 in the unlocked position. Next, the lock cylinder 300 or 350 is rotated counter-clockwise while holding the key 390 in the unlocked position. With respect to FIG. 2, a tool 550 may engage notches 555 on the lock cylinder 300 or 350 in order to rotate the lock cylinder 300 or 350. The lock spring 500 will push out the lock cylinder 300 or 350. When the lock cylinder 300 or 350 is rotated, the side bolt 315 or 365 may cam against the cam surface 120 of the lock cylinder passage 110, which further depress the side bolt 315 or 365 for removal of the lock cylinder 300 or 350.

In other aspects, the handle 50 and its channel 150 receive a striker portion that may be separate from the spring plate 400. The striker portion may include an opening similar to the opening 470 of the spring plate 400, or the striker portion may include another locking member to lockingly engage with the side bolts 315 or 365. The striker portion may include the tab portion 450 separate from the spring plate 400. The striker portion is sized to slide or insert into the channel 150. The striker portion may have a width just smaller than the channel 150.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A door lock assembly with an interchangeable lock cylinder, comprising:

a handle, the handle comprising a lock cylinder passage;

a lock cylinder comprising a locking bolt and a side bolt, wherein the lock cylinder is a push to lock cylinder or a key to lock cylinder;

the handle receives the lock cylinder in the lock cylinder passage;

a spring plate affixed to the handle, the spring plate comprising a base portion and a tab portion, the base portion comprising a bolt opening that receives the locking bolt, the tab portion comprising a side bolt opening, wherein the side bolt is configured to selectively enter the side bolt opening of the spring plate to lock the lock cylinder and to selectively withdraw the side bolt from the side bolt opening of the spring plate to unlock the lock cylinder;

an escutcheon plate comprising a locking opening;

the handle configured to rotate relative to the escutcheon plate; and, wherein the locking bolt of the lock cylinder is configured to selectively enter the locking opening of the escutcheon plate to prevent rotation of the handle and to selectively withdraw from the locking opening of the escutcheon plate to permit rotation of the handle.

2. The door lock assembly according to claim 1, wherein the tab portion is generally perpendicular to the base portion, and wherein the tab portion is integral to the base portion.

3. The door lock assembly according to claim 1, wherein the handle comprises a channel, wherein the lock cylinder passage leads to the channel.

4. The door lock assembly according to claim 3, wherein a tab portion of the spring plate is configured to fit into the channel.

5. The door lock assembly according to claim 1, wherein the handle comprises a channel, wherein a passage in the handle connects the lock cylinder passage and the channel, wherein the passage has a width smaller than a width of the channel.

6. The door lock assembly according to claim 5, wherein the side bolt is configured to enter the passage, the channel, and the side bolt opening.

7. The door lock assembly according to claim 1, wherein the door lock assembly comprises an unlocked position and a locked position, wherein in the unlocked position, the side bolt is positioned in a void above the tab portion.

8. The door lock assembly according to claim 7, wherein in the unlocked position, the side bolt is positioned in the void above an upper surface of a distal side of the tab portion.

9. The door lock assembly according to claim 1, wherein the door lock assembly comprises an unlocked position and a locked position, wherein the handle comprises a channel, wherein a connecting passage in the handle connects the lock cylinder passage and the channel, and wherein in the locked position, the side bolt is in the connecting passage and in the side bolt opening.

10. The door lock assembly according to claim 1, wherein the door lock assembly is configured to receive a different key to lock cylinder or a different push to lock cylinder without removing the spring plate.

11. The door lock assembly according to claim 1, wherein the side bolt opening of the spring plate is configured to receive the side bolt of the key to lock cylinder or the side bolt of the push to lock cylinder without moving or adjusting the spring plate.

12. The door lock assembly according to claim 1, wherein the side bolt opening passes through the tab portion.

13. The door lock assembly according to claim 1, an upper portion of the tab portion is angled or chamfered, and the upper portion leads to an upper surface, wherein the upper surface is generally flat or planar.

14. The door lock assembly according to claim 1, wherein the lock cylinder is a push to lock cylinder and the side bolt is retracted past an upper portion of the tab portion to a locking configuration or wherein the lock cylinder is a push to lock cylinder and the side bolt is retracted past the same upper portion of the tab portion to the locking configuration.

15. A door handle assembly, comprising:

a handle, the handle comprising a lock cylinder passage;

the lock cylinder passage configured to receive a push to lock cylinder or a key to lock cylinder;

a spring plate comprising a base portion and a tab portion, the tab portion is generally perpendicular to the base portion, the tab portion is integral to the base portion;

the base portion comprising a bolt opening configured to receive a locking bolt from the push to lock cylinder or the key to lock cylinder; and the tab portion comprising a side bolt opening configured to receive a side bolt from the push to lock cylinder or the key to lock cylinder, wherein the side bolt opening passes through the tab portion.

16. The door handle assembly according to claim 15, wherein the base portion of the spring plate is configured to mount to an interior surface of the handle.

17. The door handle assembly according to claim 15, wherein the handle comprises a channel configured to receive the tab portion, wherein a connecting passage in the handle connects the lock cylinder passage and the channel, wherein the lock cylinder passage in the handle comprises an upper opening in an exterior surface of the handle and a lower opening in an interior surface of the handle, wherein the channel includes a channel opening in the interior surface of the handle proximate the lower opening.

18. The door handle assembly according to claim 15, wherein the door handle assembly is configured to receive a different key to lock cylinder or a different push to lock cylinder without removing the spring plate.

19. The door handle assembly according to claim 15, wherein the side bolt opening is configured to receive the side bolt from the push to lock cylinder or the side bolt from the key to lock cylinder, and either side bolt is configured to retract past an upper portion of the tab portion to a locking configuration.

20. A door lock assembly, comprising:

a handle, the handle comprising a lock cylinder passage;

a bar, the handle configured to rotate the bar;

a lock cylinder comprising a locking bolt and a side bolt, wherein the lock cylinder is a push to lock cylinder or a key to lock cylinder;

a spring plate comprising a base portion and a tab portion, the base portion comprises a bolt opening to receive the locking bolt, the tab portion extends from the base portion, the tab portion comprising a side bolt opening, wherein the side bolt is configured to selectively enter the side bolt opening of the tab portion to lock the lock cylinder and to selectively withdraw the side bolt from the side bolt opening of the tab portion to unlock the lock cylinder;

a spring to bias the lock cylinder away from the spring plate;

the handle removably receives the lock cylinder in the lock cylinder passage;

an escutcheon plate comprising a bar opening and a locking opening;

the handle configured to rotate relative to the escutcheon plate; and wherein the bar passes through the bar opening of the escutcheon plate to engage a further locking mechanism or further handle, wherein the locking bolt is configured to selectively enter the locking opening of the escutcheon plate to prevent rotation of the handle and to selectively withdraw from the locking opening of the escutcheon plate to permit rotation of the handle.

21. A method of changing a lock cylinder in a door handle assembly, comprising:

providing door handle assembly, the door handle assembly comprising a handle, the handle comprising a lock cylinder passage; the lock cylinder passage housing a first lock cylinder; a spring plate comprising a base portion and a tab portion; the base portion comprising a bolt opening to receive a locking bolt; the tab portion comprising a side bolt opening to receive a first side bolt from the first lock cylinder;

removing the first lock cylinder from the lock cylinder passage;

providing a second lock cylinder, where the second lock cylinder includes a different style of locking mechanism than the first locking mechanism;

installing the second lock cylinder in the lock cylinder passage; and operating the second locking cylinder to extend a second side bolt into the side bolt opening without adjusting the spring plate.

* * * * *